(12) United States Patent
Batten

(10) Patent No.: US 10,527,924 B2
(45) Date of Patent: *Jan. 7, 2020

(54) MODULAR VEHICLE LICENSE PLATE CAMERA

(71) Applicant: The Whistler Group, Inc., Bentonville, AR (US)

(72) Inventor: Michael Batten, Littleton, MA (US)

(73) Assignee: THE WHISTLER GROUP, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,166

(22) Filed: Apr. 25, 2019

(65) Prior Publication Data

US 2019/0250498 A1    Aug. 15, 2019

Related U.S. Application Data

(63) Continuation of application No. 16/156,724, filed on Oct. 10, 2018, now Pat. No. 10,324,366.

(60) Provisional application No. 62/571,578, filed on Oct. 12, 2017.

(51) Int. Cl.
| | |
|---|---|
| *G03B 29/00* | (2006.01) |
| *B60R 11/04* | (2006.01) |
| *B60R 13/10* | (2006.01) |
| *H04N 5/225* | (2006.01) |
| *B60R 11/00* | (2006.01) |

(52) U.S. Cl.
CPC .............. *G03B 29/00* (2013.01); *B60R 11/04* (2013.01); *B60R 13/105* (2013.01); *H04N 5/2252* (2013.01); *B60R 2011/004* (2013.01)

(58) Field of Classification Search
CPC ....... G03B 29/00; B60R 11/04; B60R 13/105; B60R 2011/004
See application file for complete search history.

(56) References Cited

U.S. PATENT DOCUMENTS

| | | | |
|---|---|---|---|
| 6,433,680 B1* | 8/2002 | Ho ........................... | B60Q 1/22 180/169 |
| 7,283,042 B1* | 10/2007 | Cawley .................... | B60R 1/00 340/435 |
| 2003/0182829 A1* | 10/2003 | Simonazzi .............. | B60R 11/00 40/209 |
| 2005/0198876 A1* | 9/2005 | Chang ..................... | B60R 11/04 40/209 |
| 2007/0257166 A1* | 11/2007 | Christopherson ..... | B60R 13/105 248/205.5 |
| 2008/0229635 A1* | 9/2008 | Soldo ..................... | B60R 13/105 40/210 |
| 2009/0128687 A1* | 5/2009 | Woo ........................ | B60R 11/04 348/373 |

(Continued)

*Primary Examiner* — Gary C Hoge
(74) *Attorney, Agent, or Firm* — Braxton Perrone, PLLC; Gregory Perrone

(57) ABSTRACT

A motor vehicle license plate mount having a modular license plate frame including a base section and two side mounts for securing license plates of varying widths and heights to the vehicle and a camera housing including a lens and with the base section forming a slot for receiving an exterior edge of the license plate. Electrical cables connect at least one side mount to the base section providing power to the camera unit via a local solar cell disposed on at least one side mount.

16 Claims, 3 Drawing Sheets

(56) References Cited

U.S. PATENT DOCUMENTS

| | | | |
|---|---|---|---|
| 2009/0166488 A1* | 7/2009 | Luft | B60R 11/04 248/205.1 |
| 2009/0174535 A1* | 7/2009 | Tang | B60R 11/04 340/435 |
| 2010/0117862 A1* | 5/2010 | Luft | B60R 11/04 340/932.2 |
| 2010/0245572 A1* | 9/2010 | Son | B60R 11/04 348/148 |
| 2017/0210292 A1* | 7/2017 | Allen | B60Q 9/005 |
| 2017/0243489 A1* | 8/2017 | Mariotto | H04N 7/183 |

* cited by examiner

MODULAR VEHICLE LICENSE PLATE CAMERA

PRIORITY

This application claims priority to co-pending U.S. application Ser. No. 16/156,724 filed Oct. 10, 2018, which claims priority to U.S. Provisional Application No. 62/571,578 filed Oct. 12, 2017, each of which is incorporated by reference herein in its entirety.

BACKGROUND OF THE INVENTION

Technical Field

The present disclosure is directed to a configurable license plate camera system including an energy harvesting module, with both the camera and energy harvesting module independently positionable by the user. The configurable license plate system accommodates a large number of differently dimensioned license plates and allows positioning of the various components in a manner that complies with local regulations regarding obscuring information provided on the license plate.

Prior Art

Prior art after-market license plate camera systems do not permit the user to position components of the license plate camera system independently in order to provide the desired look of the camera system and comply with local regulations prohibiting obscuring license plate information.

BRIEF DESCRIPTION OF THE DRAWINGS

The invention and a preferred mode of use, further objectives and advantages thereof, will be best understood by reference to the following detailed description of illustrative embodiments when read in conjunction with the accompanying drawings, wherein.

DETAILED DESCRIPTION

Figure 1A:
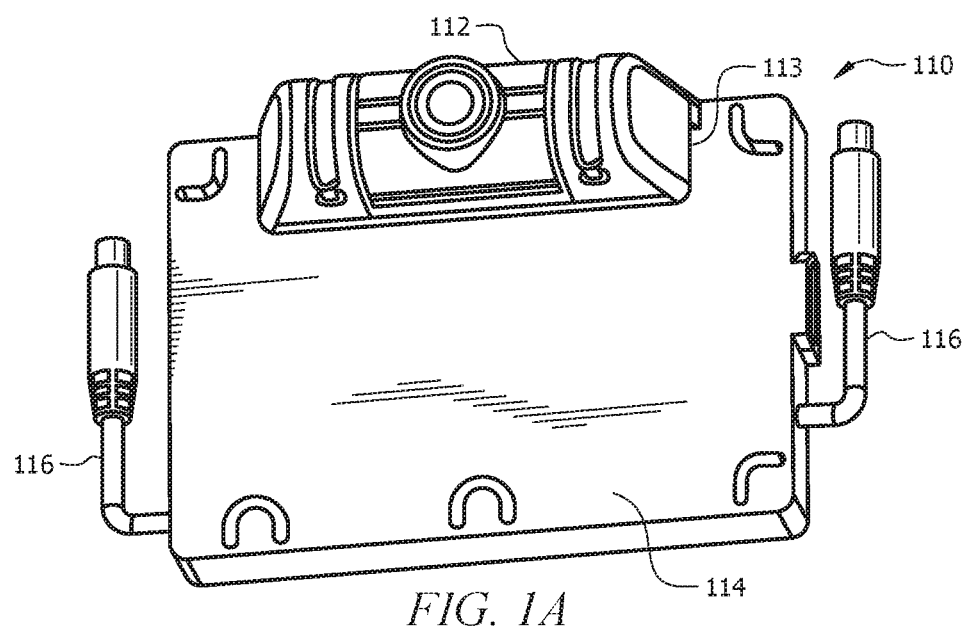
FIG. 1A depicts a camera base according to an embodiment of the presently described modular license plate camera system.

Several embodiments of the invention will now be described with reference to the drawings. Unless otherwise noted, like elements will be identified by identical numbers throughout all figures. The invention illustratively disclosed herein suitably may be practiced in the absence of any element which is not specifically disclosed herein.

A configurable system that resolve the current issues by breaking the assembly into several parts comprising a main housing, camera, energy harvesting module(s), and a backplate that can be made of a low-cost material capable of supporting the individual assemblies. The individual assemblies can also be mounted directly to the back of the license plate if needed, however, the use of the backplate allows different license plates to be inserted at a later date with ease should the user transfer this assembly between different license plates or vehicles.

Use of the modular vehicle license plate camera assembly in various countries that require different license plate dimensions, a new backplate can be easily created at a low cost and included with the system for proper fitment.

There exist several aftermarket vehicle back-up camera systems that utilize a wired or wireless means to provide video information to a monitor typically mounted inside the cab of the vehicle. Some of these camera systems can send video information wirelessly to a smart phone. Regardless of the system employed to communicate information, one common issue is the mounting of the camera and/or camera assembly to the vehicle.

Mounting of these systems vary and typically involve the customer to replace a license plate light for an OEM look while others require you attach the camera with some form of adhesive, screw into the body of the vehicle, attach on the front or rear of the license plate using one or more of the existing license plate screws, or adhere a mounting plate to the back of the license with some form of adhesive tape. Some are meant for temporary mounting and use a suction cup or magnetic mount.

Of these different systems, there exist those that require both power and a trigger source from the vehicle while others are completely wireless and are powered by an internal battery.

Systems that are required to be wired to the vehicle can be difficult to install for the average Do It Yourselfer (DIY). Locating a source of constant power (or constant power when the engine is running) can be difficult in some vehicles and may require the use of a DC volt meter or method to confirm the availability of 12 volts DC. In addition, these cameras require a trigger source such as the reverse line in order to allow the camera to transmit only when the vehicle is in reverse. The reason these cameras do not recommend the power source be connected to the reverse lamp, is to quicken the ability to provide the video information as to turn on the entire system then transmit may take additional time as compared to a system being powered and ready to send upon the trigger of the reverse lamp. The difficulty in wiring these systems has resulted in a high level of returns of products to the retailer by unsatisfied customers.

Systems that utilize an internal battery have limited use due to the power consumption of the device. Units designed for temporary use such as a trailer cam may mount with a magnet or suction cup and utilize an on/off switch to conserve power when stored and not in use. These are applied and turned on only when being used and are typically removed and shut off when not in use. Recent developments in battery technology have increased the operation time of these systems, however, the battery will eventually run down and require replacement or recharging.

A system to automatically recharge the camera system battery would serve to extend use of the camera from a mere 3-6 months of normal use to potentially unlimited operation under normal use and conditions, thus reducing the need to replace or recharge the battery manually repeatedly. Several methods can be useful to harvest energy through solar and/or vibration, however, implanting these energy harvesting devices on a license plate mounted product has significant challenges.

Vibration Energy harvesters are an emerging technology and have become useful in applications of small transmitters by harvesting vibrations to create electricity, however, the average vehicle does not create enough vibration for a long enough duration to be effective.

Solar cells have been around for many decades providing a source of power during daylight hours and do not require the vehicle be moving in order to generate energy. The issue with a solar cell is to create one of sufficient size to make sure the average energy collected is sufficient to replenish that which is consumed from the battery by the average product consumption and determine a location that is convenient for the consumer to mount.

An optimal location for the solar cells is along one or more sides of the license plate itself. However, the issue of size and location must be resolved so as to not interfere with the registration markings of the license plate, and in addition, not exceed the dimensional restrictions of the license plate mounting area provided by the vehicle manufacturers.

While there are opportunities to locate the solar cell around the perimeter of the license plate, there are a variety of license plate dimensions globally. This makes creating a single housing system for each location very costly in tooling costs as many commonly manufactured items utilize plastic housings requiring tooling be created for each new dimensioned housing.

Since automobile license plates were introduced in the early twentieth century, plates have varied in size and shape from one jurisdiction to the next, from state to state and from country to county. Accordingly, if a vehicle owner moved from one jurisdiction to another, new holes would need to be drilled into the automobile (often on the bumper) to support the new plate for the new jurisdiction. In the 1950s, automobile manufacturers came to agreement with state governments and international standards organizations and created standardized sized plates. While peculiar local variants exist, there are three basic standards worldwide:

(a) 520 by 110 mm (20.5 by 4.3 inches) or 520 by 120 mm (20.5 by 4.7 inches)—in the bulk of European countries and many of their former overseas territories, as well as North Korea and South Korea;

(b) 305 by 152 mm (12.0 by 6.0 inches) or 305 by 160 mm (12.0 by 6.3 inches)—in the majority of North America and Central America, and parts of South America; occasionally in Switzerland and Liechtenstein; and many Persian Gulf countries; and (c) 372 by 135 mm (14.6 by 5.3 inches)—in Australia and some other Pacific Rim countries, about halfway between the dimensions of the other two standards, longer than Western Hemisphere plates but taller than European plates.

Additional sizes include:
260 by 110 mm (10.2 by 4.3 inches)—in Monaco
from 275 by 200 mm (10.8 by 7.9 inches) to 340 by 220 mm (13.4 by 8.7 inches)—two line pattern, optional in several European countries for 4×4 and Imported Vehicles
275 by 205 mm (10.8 by 8.1 inches)—in Vietnam
300 by 80 mm (11.8 by 3.1 inches)—Switzerland and Liechtenstein
310 by 155 mm (12.2 by 6.1 inches)—in Saudi Arabia
320 by 90 mm (12.6 by 3.5 inches)—in Iraq
330 by 165 mm (13.0 by 6.5 inches)—in Japan
330 by 140 mm (13.0 by 5.5 inches)—in Andorra
340 by 150 mm (13.4 by 5.9 inches)—in Thailand
360 by 125 mm (14.2 by 4.9 inches)—in New Zealand
360 by 130 mm (14.2 by 5.1 inches)—in Chile
360 by 110 mm (14.2 by 4.3 inches)—in Italy (front plates), and Oman
380 by 160 mm (15.0 by 6.3 inches)—in Taiwan
390 by 120 mm (15.4 by 4.7 inches)—in San Marino
400 by 130 mm (15.7 by 5.1 inches)—in the Mercosur member countries, Brazil, Argentina, Uruguay, and others, originally based on the 2008 Brazilian standard
404 by 154 mm (15.9 by 6.1 inches)—in Ecuador
430 by 110 mm (16.9 by 4.3 inches)—in Jordan
430 by 135 mm (16.9 by 5.3 inches)—in Indonesia
440 by 120 mm (17.3 by 4.7 inches)—in South Africa and Finland
440 by 140 mm (17.3 by 5.5 inches)—in China, but 480 by 140 mm (18.9 by 5.5 inches) for New Energy vehicles
450 by 100 mm (17.7 by 3.9 inches)—in Syria and Tunisia Source: Wikipedia.com The above examples are for plates specific to the country for which they were developed. Of particular interest here is North and Central America and parts of South America, but the same manufacturing and user issues exist around the world. Costly injection molding tooling would be needed to create multiple license plate camera mounts with different physical dimensions for use in countries that do not share the same physical dimensions as the original product.

There is a need, therefore, for a modular and configurable system that allows the user to position the camera and energy harvesting modules independently and provide the means that connect both electrically and mechanically to accommodate a variety of differently dimensioned license plates with minimal manufacturing risk, investment, and expense.

Figure 1B:
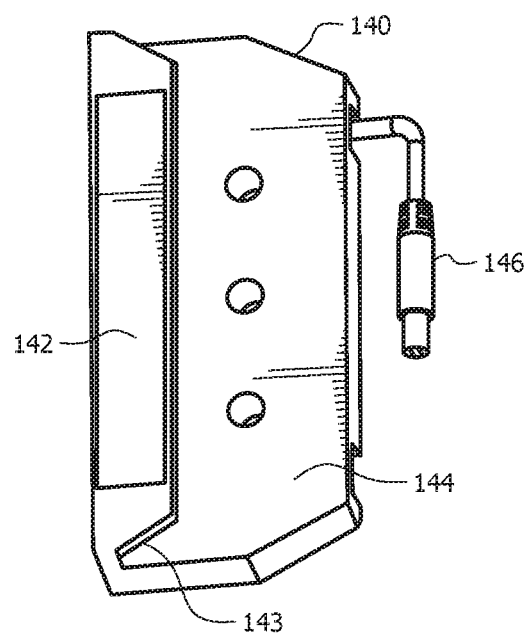
FIG. 1B depicts an energy harvesting module according to an embodiment of the presently described modular license plate camera system.
Figure 1C:
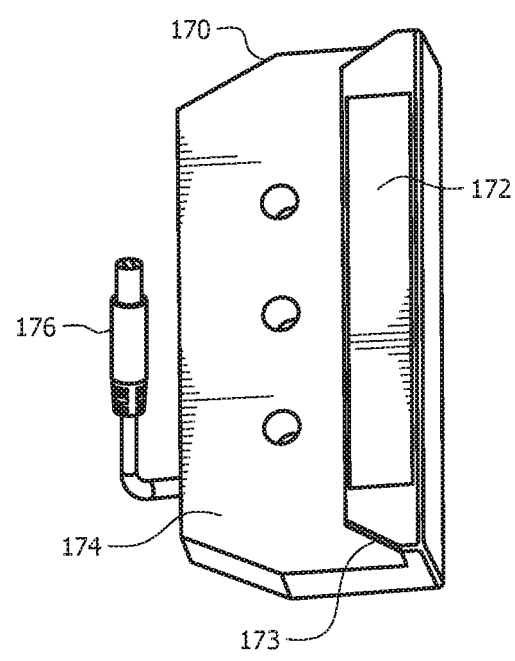
FIG. 1C depicts an energy harvesting module according to an embodiment of the presently described modular license plate camera system.

FIGS. 1A, 1B and 1C depict components of an embodiment of the presently disclosed modular vehicle license plate camera system. FIG. 1A depicts camera base 110. Camera base 110 includes camera unit 112, which comprises one of various available wireless or wired compact camera units. Camera unit 112 may be powered by a local battery or wired to the vehicle's battery. A local battery may be a chargeable battery, chargeable through an energy harvesting module, such as solar cells that will be described below.

Camera base 110 also includes slot 113 between camera unit 112 and camera base plate 114. Slot 113 is sized to receive a long edge of a license plate having a common thickness of between 1 and 4 millimeters. Slot 113, however, may be sized to accommodate a license plate of any thickness.

Camera base plate 114 is of sufficient height and width to provide a solid base for adhering to the back of a license plate as will be described. Camera base 110 further comprises cables 116 situated on either side of camera base 110. Cables 116 include jacks to allow connection to a power source, such as a solar cell as will be described.

FIGS. 1B and 1C depict a pair of solar cell side mounts according to an embodiment of the presently disclosed modular license plate camera. FIG. 1B depicts a left solar cell mount 140 comprising solar cell 142, which is a rectangular shape in the presented embodiment to minimize interference with license plate information that must remain visible, but at the same time provide adequate energy harvesting to operate camera unit 112. Left solar cell mount 140 further comprises slot 143 formed by the void between solar cell 142 and left solar cell mount platform 144. Left solar cell mount platform is on sufficient height and width to support the various components of left solar cell mount 140 and to also provide sufficient surface area for adhering a received license plate, as will be described.

Left solar cell mount 140 also comprises power cable 146 for receiving a cable 116 of camera base 110 in order to supply power to camera unit 112.

FIG. 1C depicts a right solar cell mount 170 comprising solar cell 172, which is a rectangular shape in the presented embodiment to minimize interference with license plate information that must remain visible, but at the same time provide adequate energy harvesting to supply power to camera unit 112. Right solar cell mount 170 further comprises slot 173 formed by the void between solar cell 172 and right solar cell mount platform 174. Right solar cell mount platform 174 is of sufficient height and width to support the various components of right solar cell mount 170 and to also provide sufficient surface area for adhering a received license plate, as will be described.

Right solar cell mount 170 also comprises power cable 176 for receiving a cable 116 of camera base 110 in order to supply power to camera unit 112.

Figure 2:
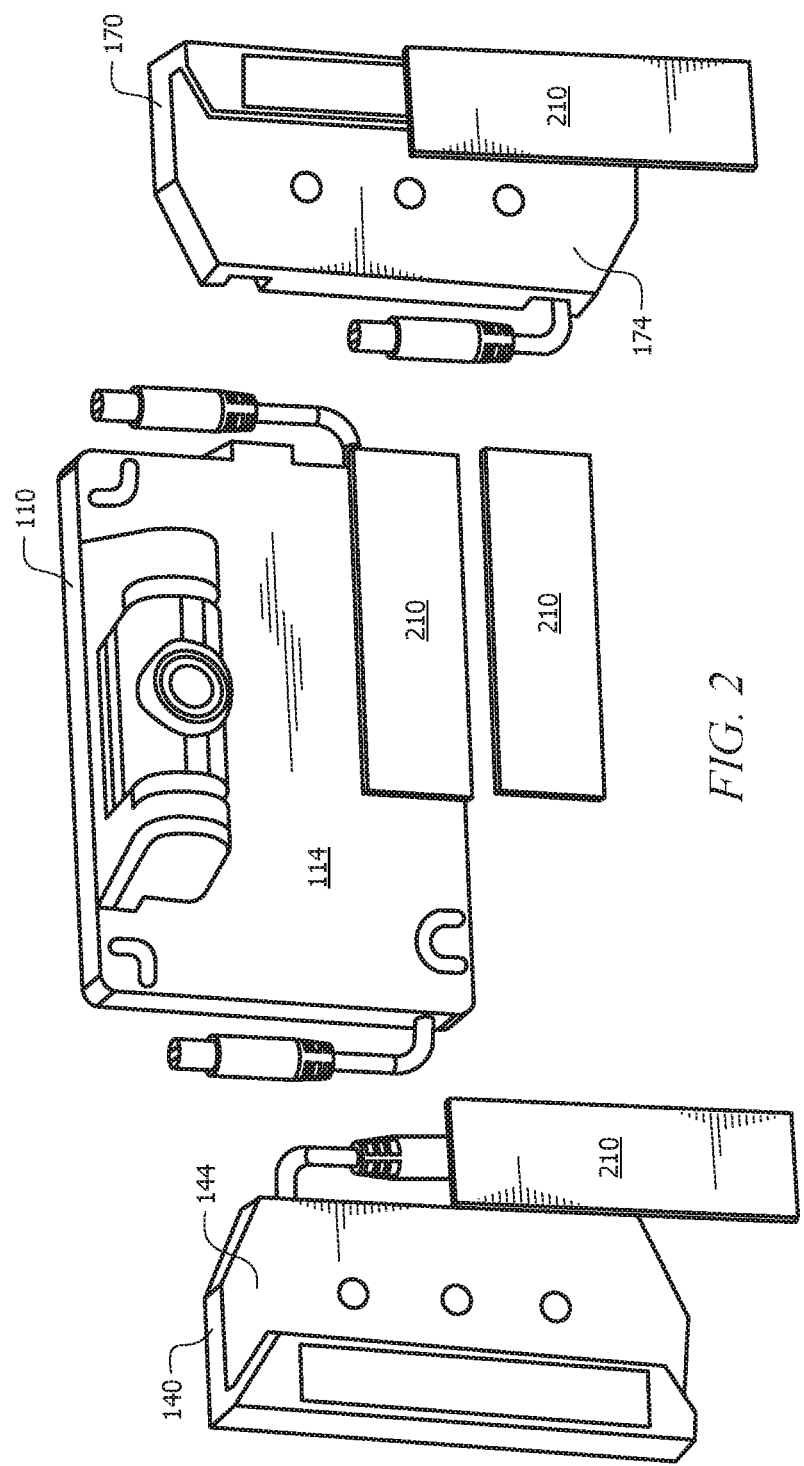
FIG. 2 depicts a camera base and energy harvesting modules according to an embodiment of the presently described modular license plate camera system.

FIG. 2 depicts the combination of camera base 110 and left solar cell mount 140 and right solar cell mount 170. As can be seen, the arrangement of these components are roughly the configuration of a standard rectangular license plate, although the width and height of such license plates may vary. As shown, double sided adhesive strips 210 can be applied to camera base plate 114 and left and right solar cell mounting platforms 144 and 174 to secure the license plate to the camera and solar cell modules once the license plate is in the desired position.

Figure 3:
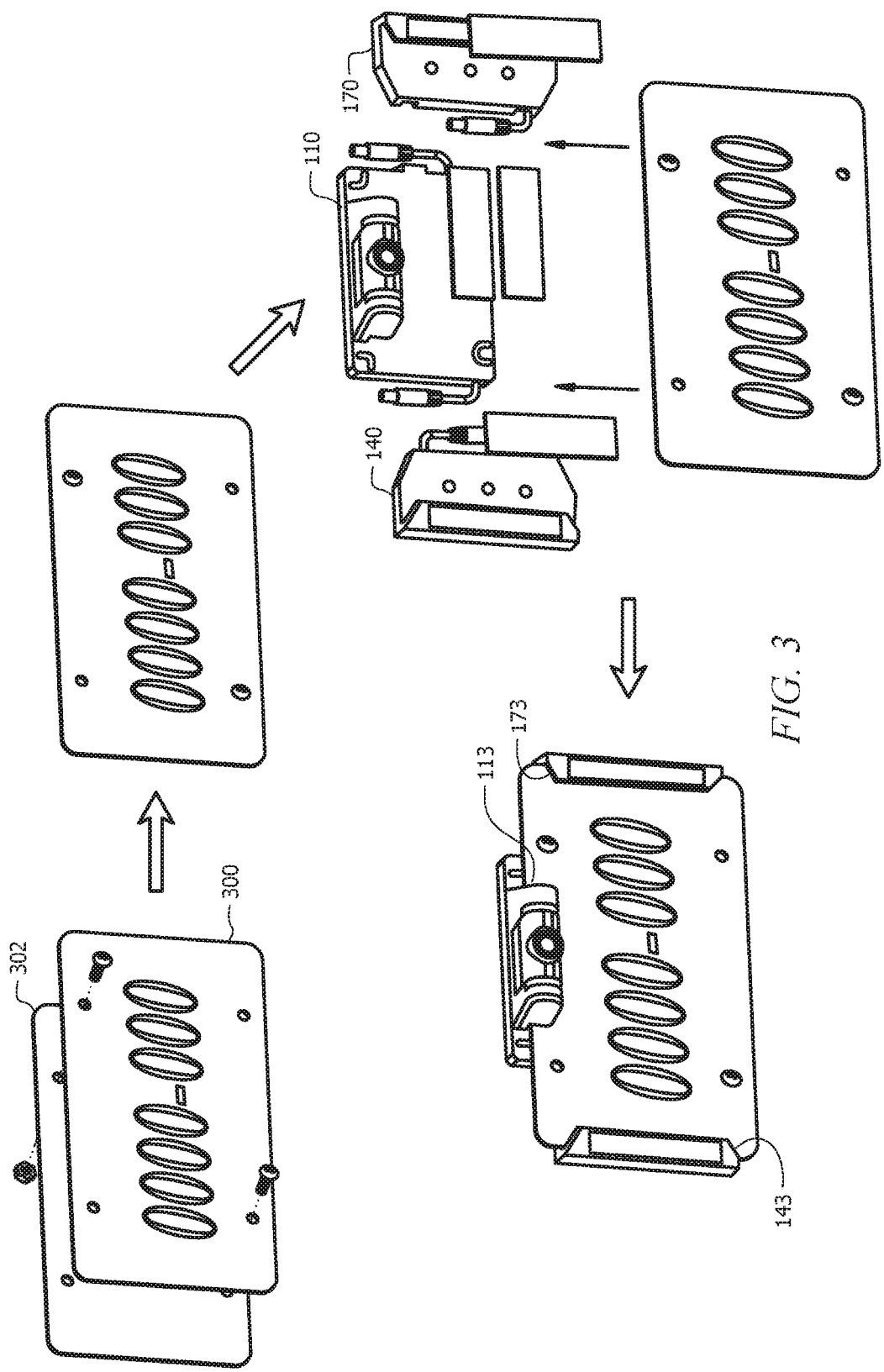
FIG. 3 depicts a license plate installed in a camera base and energy harvesting modules according to an embodiment of the presently described modular license plate camera system.

FIG. 3 depicts license plate installation in an embodiment of the presently described modular vehicle license plate camera assembly. In FIG. 3, license plate 300 is of a height and width common among many nation's license plates, including the United States and all of North America. The assembly can include backplate 302 on which cameral base 114 and left and right solar cell mounts 140 and 170. This can be advantageous to allow the user to continue use of the installed camera components even though the license plate may change. As shown, license plate 300 in inserted through slots 143 and 173 of left and right solar cell mounts 140 and 170 up to slot 113 in camera base 110 and securely fastened within solar cell mounts 140 and 170 and camera base 110 with double sided adhesive strips 210 or any other suitable fastening means, such as screws, rivets, tied down strips or the like. This provides three points of security around the perimeter of license plate 300. The license plate and the camera assembly can then be mounted to the vehicle with screws through holes in license plate 300 into threaded female receiving members typically embedded in the vehicle. Alternatively, backplate 302 can be inserted into slots 113, 143 and 173 and fastened to the camera base 110 and left and right solar cell mounts 140 and 170 with two sided adhesive strips 210. Then, license plate 300 and backplate 302 can be installed in a stack with license plate 300 also inserted into slots 143, 173 and 113, with both license plate 300 and backplate 302 further secured by bolts through pre-drilled holes.

The modular nature of camera base 110 and left and right solar cell mounts 140 and 170 provide multiple levels of customization to accommodate the different needs of users residing in jurisdictions having different license plate related rules and regulations. For example, in jurisdictions where the jurisdiction name, such as a state's name is printed on the license plate along the upper, central portion of the plate, camera base 110 may be installed on the lower edge of the plate. Alternatively, the camera base 110 may be offset from center so as to not encroach the areas in which the state name appears. This is made possible by the slots herein described in which the plate may be slidably engaged. Similarly, the plate may be vertically adjusted within slots 143 and 173 of left and right solar cell mounts 140 and 170 to accommodate plates of different heights. The modular nature of the vehicle license plate camera assembly herein described lends itself to numerous positions to keep users in compliance with local regulations while taking advantage of energy harvesting techniques. In jurisdictions where the jurisdiction name is printed near the bottom of the long side of the license plate, camera base 110 may be installed along the upper edge of the plate. Similarly, camera base 110 may be offset from center so as to not encroach the area in which the jurisdiction name appears.

The foregoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While the disclosed embodiments have been described with reference to one or more particular implementations, these implementations are not intended to limit or restrict the scope or applicability of the invention. Those having ordinary skill in the art will recognize that many modifications and alterations to the disclosed embodiments are available. Therefore, each of the foregoing embodiments and obvious variants thereof is contemplated as falling within the spirit and scope of the disclosed inventions.

While the invention has been particularly shown and described with reference to a preferred embodiment, it will be understood by those skilled in the art that various changes in form and detail can be made therein without departing from the spirit and scope of the invention.

Additional Description

The following clauses are offered as further description of the disclosed invention.

Clause 1. A modular vehicle license plate frame, comprising:
  a base plate;
  a camera housing disposed approximate to an edge of the base plate;
  a first slot disposed between a camera lens and the base plate;
  at least one base plate electrical cable disposed on the base plate; and
  at least one side plate containing a first solar cell section and at least one first side plate electrical cable for connection to the at least one base plate electrical cable.
  wherein the first slot has a thickness approximate to the thickness of a license plate for receiving a license plate.

Clause 2. The modular vehicle license plate frame of any proceeding or preceding clause, further comprising a second side plate.

Clause 3. The modular vehicle license plate frame of any proceeding or preceding clause, further comprising a second base plate electrical cable disposed on the base plate.

Clause 4. The modular vehicle license plate frame of any proceeding or preceding clause, wherein the second side plate comprises a second solar cell section and at least one second side plate electrical cable for connection to the second base plate electrical cable.

Clause 5. The modular vehicle license plate frame of any proceeding or preceding clause, further comprising a second slot disposed between the first solar cell section and the first side plate.

Clause 6. The modular vehicle license plate frame of any proceeding or preceding clause, further comprising a third slot disposed between the second solar cell section and the second side plate.

Clause 7. The modular vehicle license plate frame of any proceeding or preceding clause wherein the second slot has a thickness approximate to the thickness of a license plate for receiving the license plate.

Clause 8. The modular vehicle license plate frame of any proceeding or preceding clause wherein the third slot has a thickness approximate to the thickness of a license plate for receiving the license plate.

Clause 9. The modular vehicle license plate frame of any proceeding or preceding clause, further comprising an adhesive for adhering the license plate to the base plate.

Clause 10. The modular vehicle license plate frame of any proceeding or preceding clause, further comprising an adhesive for adhering the license plate to at least one of the first side plate and the second side plate.

Clause 11. The modular vehicle license plate frame of any proceeding or preceding clause, further comprising an adhesive for adhering a back plate to the base plate.

Clause 12. The modular vehicle license plate frame of any proceeding or preceding clause, further comprising an adhesive for adhering a back plate to at least one of the first side plate and the second side plate.

Clause 13. The modular vehicle license plate frame of any proceeding or preceding clause, wherein the distance between the first side plate and the second side plate of an assembled modular vehicle license plate frame is 260 to 520 millimeters.

Clause 14. The modular vehicle license plate frame of any preceding clause, wherein the distance between the first side plate and the second side plate of an assembled modular vehicle license plate frame is 275 to 330 millimeters.

I claim:

1. A modular vehicle license plate frame, comprising:
   a base plate;
   a camera housing disposed approximate to an edge of the base plate;
   at least one base plate electrical cable disposed on the base plate; and
   at least one side plate containing a first solar cell section and at least one first side plate electrical cable for connection to the at least one base plate electrical cable.

2. The modular vehicle license plate frame of claim 1, further comprising a first slot disposed between a camera lens and the base plate.

3. The modular vehicle license plate frame of claim 2, wherein the first slot has a thickness approximate to the thickness of a license plate for receiving the license plate.

4. The modular vehicle license plate frame of claim 1, further comprising a second side plate.

5. The modular vehicle license plate frame of claim 2, further comprising a second base plate electrical cable disposed on the base plate.

6. The modular vehicle license plate frame of claim 5, wherein the second side plate comprises a second solar cell section and at least one second side plate electrical cable for connection to the second base plate electrical cable.

7. The modular vehicle license plate frame of claim 6, further comprising a second slot disposed between the first solar cell section and the first side plate.

8. The modular vehicle license plate frame of claim 7, further comprising a third slot disposed between the second solar cell section and the second side plate.

9. The modular vehicle license plate frame of claim 8, wherein the second slot has a thickness approximate to the thickness of a license plate for receiving the license plate.

10. The modular vehicle license plate frame of claim 9, wherein the third slot has a thickness approximate to the thickness of a license plate for receiving the license plate.

11. The modular vehicle license plate frame of claim 1, further comprising an adhesive for adhering the license plate to the base plate.

12. The modular vehicle license plate frame of claim 4, further comprising an adhesive for adhering the license plate to at least one of the first side plate and the second side plate.

13. The modular vehicle license plate frame of claim 1, further comprising an adhesive for adhering a back plate to the base plate.

14. The modular vehicle license plate frame of claim 4, further comprising an adhesive for adhering a back plate to at least one of the first side plate and the second side plate.

15. The modular vehicle license plate frame of claim 4, wherein the distance between the first side plate and the second side plate of an assembled modular vehicle license plate frame is 260 to 520 millimeters.

16. The modular vehicle license plate frame of claim 15, wherein the distance between the first side plate and the second side plate of an assembled modular vehicle license plate frame is 275 to 330 millimeters.

* * * * *